United States Patent [19]
Cohen et al.

[11] Patent Number: 5,443,886
[45] Date of Patent: Aug. 22, 1995

[54] HYDROSONICALLY EMBEDDED SOFT THIN FILM MATERIALS

[75] Inventors: Bernard Cohen, Berkley Lake; Lee K. Jameson, Roswell, both of Ga.

[73] Assignee: Kimberly-Clark Corporation, Neenah, Wis.

[21] Appl. No.: 768,494

[22] Filed: Sep. 30, 1991

[51] Int. Cl.⁶ ............................................. B32B 3/10
[52] U.S. Cl. ......................... 428/131; 428/138; 428/221; 428/326; 428/364; 428/375; 428/902
[58] Field of Search ............... 428/95, 85, 221, 902, 428/364, 131, 375, 138, 326

[56] References Cited

U.S. PATENT DOCUMENTS

| | | | |
|---|---|---|---|
| Re. 33,063 | 9/1989 | Obeda | 156/73.1 |
| 1,982,587 | 11/1934 | Wilkins | 204/6 |
| 2,289,177 | 7/1942 | Chandler | 154/43 |
| 2,533,609 | 12/1950 | Nolan et al. | 18/47.5 |
| 2,740,184 | 4/1956 | Thomas | 28/78 |
| 3,025,585 | 3/1962 | Griswold | 28/1 |
| 3,097,149 | 7/1963 | Lacroix | 204/146 |
| 3,155,460 | 11/1964 | Mears | 29/183.5 |
| 3,253,317 | 5/1966 | Such | 28/76 |
| 3,333,032 | 7/1967 | Dickinson | 264/21 |
| 3,352,769 | 11/1967 | Ruben | 204/143 |
| 3,400,188 | 9/1968 | Olson | 264/156 |
| 3,451,884 | 6/1969 | Anno et al. | 161/53 |
| 3,488,240 | 1/1970 | Roberts | 156/73 |
| 3,571,679 | 3/1971 | VanTurnhout | 317/262 |
| 3,575,752 | 4/1971 | Carpenter | 156/73 |
| 3,594,134 | 7/1971 | Russell et al. | 29/191.4 |
| 3,635,609 | 1/1972 | Balamuth | 425/3 |
| 3,640,786 | 2/1972 | Carpenter | 156/73 |
| 3,642,967 | 2/1972 | Doll | 264/51 |
| 3,660,186 | 5/1972 | Sager et al. | 156/73 |
| 3,683,736 | 8/1972 | Loose | 83/16 |
| 3,713,960 | 1/1973 | Cochran | 428/92 |
| 3,723,754 | 3/1973 | Murayama et al. | 307/88 ET |
| 3,756,880 | 9/1973 | Graczyk | 156/73 |
| 3,790,652 | 2/1974 | Colijn et al. | 264/146 |
| 3,794,174 | 2/1974 | Booman et al. | 210/321 |
| 3,814,101 | 6/1974 | Kozak | 128/287 |
| 3,818,522 | 6/1974 | Schuster | 5/347 |
| 3,832,267 | 8/1974 | Liu | 161/116 |
| 3,839,525 | 10/1974 | Doll | 264/154 |
| 3,881,489 | 5/1975 | Hartwell | 128/287 |
| 3,886,941 | 6/1975 | Duane et al. | 128/287 |
| 3,929,135 | 12/1975 | Thompson | 128/287 |
| 3,949,127 | 4/1976 | Ostermeier et al. | 428/137 |
| 3,956,450 | 5/1976 | Abe et al. | 264/210 R |
| 3,963,309 | 6/1976 | Schwab | 350/104 |
| 3,966,519 | 6/1976 | Mitchell et al. | 156/73.1 |
| 3,989,867 | 11/1976 | Sisson | 428/132 |
| 3,998,916 | 12/1976 | VanTurnhout | 264/22 |
| 4,028,033 | 6/1977 | Bryant | 425/183 |
| 4,105,724 | 8/1978 | Talbot | 261/112 |
| 4,125,682 | 8/1980 | Kubik et al. | 128/205.29 |
| 4,242,392 | 12/1980 | Yacken | 428/92 |

(List continued on next page.)

FOREIGN PATENT DOCUMENTS

| | | |
|---|---|---|
| A34013/84 | 4/1985 | Australia . |
| 0141556 | 5/1985 | European Pat. Off. . |
| 0195113 | 9/1986 | European Pat. Off. . |
| 0203820 | 12/1986 | European Pat. Off. . |
| 0256717A2 | 2/1988 | European Pat. Off. . |
| 0259003 | 3/1988 | European Pat. Off. . |
| 0301599 | 2/1989 | European Pat. Off. ..... B29D 28/00 |
| 0302611A1 | 2/1989 | European Pat. Off. . |

(List continued on next page.)

OTHER PUBLICATIONS

Copies of European Search Reports.
"Ultrasonics/High Power", Kirk–Othmer *Encyclopedia of Chemical Technology*, vol. 23, pp. 462–479, ©1983.
"Crop Control", *Modern Plastics*, May 1991, pp. 58–60.
"Recent Progress in Electret Research", *Topics in Applied Physics*, vol. 33, 2nd ed., 1987, pp. 383–431.
*Electrets and Related Electrostatic Charge Storage Phe-*
(List continued on next page.)

*Primary Examiner*—James J. Bell
*Attorney, Agent, or Firm*—Joseph P. Harps

[57] ABSTRACT

A thin soft film material having fibers and/or particulates embedded therein is disclosed. A process for effecting such embedding utilizing hydrosonics is also disclosed.

18 Claims, 7 Drawing Sheets

U.S. PATENT DOCUMENTS

| | | | |
|---|---|---|---|
| 4,311,542 | 1/1982 | Mueller et al. | 156/84 |
| 4,369,219 | 1/1983 | Goepp et al. | 428/138 |
| 4,375,718 | 3/1983 | Wadsworth et al. | 29/592 |
| 4,389,211 | 6/1983 | Lenaghan | 604/383 |
| 4,406,720 | 9/1983 | Wang et al. | 156/73.2 |
| 4,414,045 | 11/1983 | Wang et al. | 156/73.2 |
| 4,414,244 | 11/1983 | Timberlake et al. | 427/105 |
| 4,438,167 | 3/1984 | Schwarz | 428/138 |
| 4,439,475 | 3/1984 | Lang | 428/92 |
| 4,472,328 | 9/1984 | Sugimoto et al. | 264/41 |
| 4,488,928 | 12/1984 | Khan et al. | 156/495 |
| 4,588,537 | 5/1986 | Klaase et al. | 264/22 |
| 4,592,815 | 6/1986 | Nakao | 204/165 |
| 4,601,868 | 7/1986 | Radel et al. | 264/504 |
| 4,605,454 | 8/1986 | Sayovitz et al. | 156/73.1 |
| 4,609,518 | 9/1986 | Curro et al. | 264/504 |
| 4,623,438 | 11/1986 | Felton et al. | 204/168 |
| 4,629,643 | 12/1986 | Curro et al. | 428/131 |
| 4,645,500 | 2/1987 | Steer | 604/378 |
| 4,695,422 | 9/1987 | Curro et al. | 264/504 |
| 4,731,282 | 3/1988 | Tsukagoshi et al. | 428/90 |
| 4,735,843 | 4/1988 | Noda | 428/137 |
| 4,747,895 | 5/1988 | Wallerstein et al. | 156/73.3 |
| 4,775,571 | 10/1988 | Mizuno et al. | 428/141 |
| 4,777,073 | 10/1988 | Sheth | 428/155 |
| 4,778,644 | 10/1988 | Curro et al. | 264/557 |
| 4,798,604 | 1/1989 | Carter | 604/383 |
| 4,801,379 | 1/1989 | Ehrsam et al. | 210/498 |
| 4,815,714 | 3/1989 | Douglas | 264/22 |
| 4,842,794 | 6/1989 | Hovis et al. | 264/145 |
| 4,895,749 | 1/1990 | Rose | 428/132 |
| 4,898,761 | 2/1990 | Dunaway et al. | 428/137 |
| 4,900,317 | 2/1990 | Buell | 604/370 |
| 4,929,319 | 5/1990 | Dinter et al. | 204/164 |
| 4,931,343 | 6/1990 | Becker et al. | 428/95 |
| 4,944,854 | 7/1990 | Felton et al. | 204/168 |
| 4,955,164 | 9/1990 | Hashish et al. | 51/321 |
| 4,980,215 | 12/1990 | Schonbrun | 428/72 |
| 4,995,930 | 2/1991 | Merz et al. | 156/209 |
| 5,015,521 | 5/1991 | Fujii et al. | 428/220 |
| 5,059,454 | 10/1991 | Todd et al. | 427/259 |
| 5,098,755 | 3/1992 | Tanquary et al. | 428/35.5 |
| 5,116,662 | 5/1992 | Morman | 428/198 |
| 5,225,018 | 7/1993 | Zeldin et al. | 156/167 |

FOREIGN PATENT DOCUMENTS

| | | | |
|---|---|---|---|
| 0535581 | 4/1993 | European Pat. Off. | B26F 1/26 |
| 1334711 | 7/1963 | France . | |
| 3723404A1 | 1/1989 | Germany . | |
| 4130961 | 3/1992 | Germany | B29D 28/00 |
| 5038755 | 12/1975 | Japan . | |
| 1018971 | 2/1966 | United Kingdom . | |
| 1073605 | 6/1967 | United Kingdom . | |
| 1253664 | 11/1971 | United Kingdom . | |
| 2124134 | 8/1986 | United Kingdom . | |
| 2218990 | 11/1989 | United Kingdom . | |
| 9200798 | 1/1992 | WIPO | B01D 67/00 |

OTHER PUBLICATIONS

*nomena*, ©1968 by The Electrochemical Society, Inc.
*Sonochemistry: The Uses of Ultrasound in Chemistry*, Mason, T. J., Royal Society of Chemistry, pp. 83, 85.
Translation of Japanese Patent Application No. HEI 3(1991)—260160.

HYDROSONICALLY EMBEDDED SOFT THIN FILM MATERIALS

RELATED APPLICATIONS

This application is one of a group of applications which are being filed on the same date. It should be noted that this group of applications includes U.S. patent application Ser. No. 07/769,050, entitled "Hydrosonically Microapertured Thin Thermoset Sheet Materials" in the names of Lee K. Jameson and Bernard Cohen; U.S. patent application Ser. No. 07/769,047, entitled "Hydrosonically Microapertured Thin Thermoplastic Sheet Materials" in the names of Bernard Cohen and Lee K. Jameson; U.S. patent application Ser. No. 07/768,782, entitled "Pressure Sensitive Valve System and Process For Forming Said System" in the names of Lee K. Jameson and Bernard Cohen; U.S. patent application Ser. No. 07/768,494, entitled "Hydrosonically Embedded Soft Thin Film Materials and Process For Forming Said Materials" in the names of Bernard Cohen and Lee K. Jameson; U.S. patent application Ser. No. 07/768,787, entitled "Hydrosonically Microapertured Thin Naturally Occurring Polymeric Sheet Materials and Method of Making the Same" in the names of Lee K. Jameson and Bernard Cohen; U.S. patent application Ser. No. 07/769,048, entitled "Hydrosonically Microapertured Thin Metallic Sheet Materials" in the names of Bernard Cohen and Lee K. Jameson; U.S. patent application Ser. No. 07/769,045, entitled "Process For Hydrosonically Microaperturing Thin Sheet Materials" in the names of Lee K. Jameson and Bernard Cohen; and U.S. patent application Ser. No. 07/767,727, entitled "Process For Hydrosonically Area Thinning Thin Sheet Materials" in the names of Bernard Cohen and Lee K. Jameson. All of these applications are hereby incorporated by reference.

FIELD OF THE INVENTION

The field of the present invention encompasses film materials having fibers and/or particulates embedded therein.

BACKGROUND OF THE INVENTION

Ultrasonics is basically the science of the effects of sound vibrations beyond the limit of audible frequencies. Ultrasonics has been used in a wide variety of applications. For example, ultrasonics has been used for (1) dust, smoke and mist precipitation; (2) preparation of colloidal dispersions; (3) cleaning of metal parts and fabrics; (4) friction welding; (5) the formation of catalysts; (6) the degassing and solidification of molten metals; (7) the extraction of flavor oils in brewing; (8) electroplating; (9) drilling hard materials; (10) fluxless soldering and (10) nondestructive testing such as in diagnostic medicine.

The object of high power ultrasonic applications is to bring about some permanent physical change in the material treated. This process requires the flow of vibratory power per unit of area or volume. Depending on the application, the power density may range from less than a watt to thousands of watts per square centimeter. Although the original ultrasonic power devices operated at radio frequencies, today most operate at 20–69 kHz.

The piezoelectric sandwich-type transducer driven by an electronic power supply has emerged as the most common source of ultrasonic power. The overall efficiency of such equipment (net acoustic power per electric-line power) is typically greater than 70%. The maximum power from a conventional transducer is inversely proportional to the square of the frequency. Some applications, such as cleaning, may have many transducers working into a common load.

Other, more particular areas where ultrasonic vibratory force has been utilized are in the areas of thin nonwoven webs and thin films. For example, ultrasonic force has been use to bond or weld nonwoven webs. See, for example, U.S. Pat. Nos. 3,575,752 to Carpenter, 3,660,186 to Sager et al., 3,966,519 to Mitchell et al., and 4,695,454 to Sayovitz et al. which disclose the use of ultrasonics to bond or weld nonwoven webs. U.S. Pat. No. 3,488,240 to Roberts, describes the use of ultrasonics to bond or weld thin films such as oriented polyesters.

Ultrasonic force has also been utilized to aperture nonwoven webs. See, for example, U.S. Pat. Nos. 3,949,127 to Ostermeier et al. and 3,966,519 to Mitchell et al..

Lastly, ultrasonic force has been used to aperture thin film material. See, for example, U.S. Pat. No. 3,756,880 to Graczyk.

Other methods for the aperturing of thin film have been developed. For example, U.S. Pat. No. 4,815,714 to Douglas discusses the aperturing of a thin film by first abrading the film, which is in filled and unoriented form, and then subjecting the film to corona discharge treatment.

One of the difficulties and obstacles in the use of ultrasonic force in the formation of apertures in materials is the fact that control of the amount of force which is applied was difficult. This lack of control generally resulted in the limitation of ultrasonic force to form large apertures as opposed to small microapertures. Such an application is discussed in U.K. patent application number 2,124,134 to Blair. One of the possible reasons that ultrasonics has not found satisfactory acceptance in the area of microaperture formation is that the amount of vibrational energy required to form an aperture often resulted in a melt-through of the film.

As has previously been stated, those in the art had recognized that ultrasonics could be utilized to form apertures in nonwoven webs. See, U.S. patent to Mitchell, et al.. Additionally, the Mitchell et al. patent discloses that the amount of ultrasonic energy being subjected to a nonwoven web could be controlled by applying enough of a fluid to the area at which the ultrasonic energy was being applied to the nonwoven web so that the fluid was present in uncombined form. Importantly, the Mitchell, et al. patent states that the fluid is moved by the action of the ultrasonic force within the nonwoven web to cause aperture formation in the web by fiber rearrangement and entanglement. The Mitchell et al. patent also states that, in its broadest aspects, since these effects are obtained primarily through physical movement of fibers, the method of their invention may be utilized to bond or increase the strength of a wide variety of fibrous webs.

While the discovery disclosed in the Mitchell et al. patent, no doubt, was an important contribution to the art, it clearly did not address the possibility of embedding solid materials such as fibers and particulates into thin soft film materials. This fact is clear because the Mitchell et al. patent clearly states the belief that the mechanism of aperture formation depended upon fiber rearrangement within a web material. Of course, thin soft film materials do not have fibers and thus there are no intra-web fibers to be rearranged. Accordingly, it can be stated with conviction that the applicability of a method for embedding solid materials such as fibers and particulates into a thin soft film material by the application of ultrasonic energy in conjunction with a fluid at the point of application of the ultrasonic energy to the thin nonfibrous elastomeric sheet material was not contemplated by the Mitchell et al. patent. Moreover, the relevance of the Mitchell et al. patent to such an application is questionable because the patent is directed toward aperture formation as opposed to embedding materials into a thin soft film material.

As is discussed in the related applications, disclosed above, the applicants of the present invention have been conducting a considerable amount of research in the area of application of ultrasonics. As a result of these investigations, some surprising discoveries have been made.

DEFINITIONS

As used herein the term "soft material", refers to any material that is capable of having fibers or particulates embedded therein by hydrosonic processing. Examples of soft materials include, without limitation, certain thermoplastic film materials and certain materials derived from natural materials. Some experimentation is necessary because if the material is too hard fibers and/or particulates cannot be embedded therein. Conversely, if the material is too elastic fibers and particulates cannot be embedded because, it is believed, they bounce off of the material during hydrosonic processing.

As used herein the term "soft film material" refers to a generally nonporous film formed from a material that can be arranged in generally planar configuration which. This term is also intended to include multilayer materials which include, as a surface layer thereof, at least one such soft film material as a layer thereof.

As used herein the term "thin soft film material" refers to a soft film material having an average thickness generally of less than about ten (10) mils. Average thickness is determined by randomly selecting five (5) locations on a given film material, measuring the thickness of the film material at each location to the nearest 0.1 mil, and averaging the five values (sum of the five values divided by five).

As used herein the term "mesh count" refers to the number which is the product of the number of wires in a wire mesh screen in both the machine (MD) and cross-machine (CD) directions in a given unit area. For example, a wire mesh screen having 100 wires per inch. in the machine direction and 100 wires per inch in the cross machine direction would have a mesh count of 10,000 per square inch. As a result of the interweaving of these wires, raised areas are present on both sides of the mesh screen. The number of raised areas on one side of such a wire mesh screen is generally one-half of the mesh count.

As used herein the term "aperture" refers to a generally linear hole or passageway. Aperture is to be distinguished from and does not include holes or passageways having the greatly tortuous path or passageways found in membranes.

As used herein the term "microaperture" refers to an aperture which has an area of less than about 100,000 square micrometers. The area of the microaperture is to be measured at the narrowest point in the linear passageway or hole.

As used herein the term "ultrasonic vibrations" refers to vibrations having a frequency of at least about 20,000 cycles per second. The frequency of the ultrasonic vibrations may range from about 20,000 to about 400,000 cycles per second.

As used herein the term "hydrosonics" refers to the application of ultrasonic vibrations to a material where the area of such application is has had a liquid applied thereto to the extent that the liquid is present in sufficient quantity to generally fill the gap between the tip of the ultrasonic horn and the surface of the material.

OBJECTS OF THE INVENTION

Accordingly, it is a general object of the present invention to provide a thin soft film material which has fibers and/or particulates embedded therein.

It is another general object of the present invention to provide a process for embedding fibers and/or particulates in thin soft film materials.

Still further objects and the broad scope of applicability of the present invention will become apparent to those of skill in the art from the details given hereinafter. However, it should be understood that the detailed description of the presently preferred embodiments of the present invention is given only by way of illustration because various changes and modifications well within the spirit and scope of the invention will become apparent to those of skill in the art in view of this detailed description.

SUMMARY OF THE INVENTION

As is revealed in detail in the referenced related applications, we have discovered that thin sheet materials may be microapertured if they are subjected to hydrosonic treatment against an anvil where the anvil is a pattern anvil having a pattern of raised areas. that have a height which is greater than the thickness of the thin sheet material to be apertured. While conducting the experiments discussed in detail in the referenced related applications, some experiments were conducted to determine whether the presence of solids in the fluid would affect the microaperturing process. Much to our surprise, not only was the microaperturing process generally not affected, but we discovered that the hydrosonic force actually embedded the fibers and particulates which we had added to the coupling fluid to act as impurities into the sheet material while the sheet material was still apertured.

In additional experiments it was determined that, if the pattern anvil was removed and an anvil having a planar surface was substituted for the pattern anvil, the thin sheet material would no longer be microapertured but would still have the fibers and/or particulates embedded therein.

Accordingly, we have developed a thin soft film material having fibers and/or particulates embedded therein. The fibers to be embedded may be of any type which is able to withstand hydrosonic treatment. For example, the fibers to be embedded may be selected from the group including metallic fibers such as are found in steel wool; naturally occurring fibers such as, for example, wood pulp fibers, cotton fibers and wool fibers; and synthetic fibers such as polyolefin fibers, rayon fibers and nylon fibers. The particulates to be embedded may be of any type which is able to withstand hydrosonic treatment. For example, the particulates may be selected from the group including calcium carbonate, silicon carbide, diamond or activated charcoal. In some embodiments both fibers and particulates may be embedded into the thin soft film material.

In some embodiments the thin soft film material may be formed from the group of materials selected from the group including soft polypropylenes, soft polyethylenes, soft urethanes, soft alginates or carrageenan.

As was stated above, in some embodiments the thin soft film which is embedded with fibers and/or particulates may also be microapertured so that it defines at least about 1,000 microapertures per square inch. For example, the thin soft film material which is embedded with fibers and/or particulates may also be microapertured so that it defines at least about 5,000 microapertures per square inch. More particularly, the thin soft film material which is embedded with fibers and/or particulates may also be microapertured so that it defines at least about 20,000 microapertures per square inch. Even more particularly, the thin soft film material which is embedded with fibers and/or particulates may also be microapertured so that it defines at least about 90,000 microapertures per square inch. Yet even more particularly, the thin soft film material which is embedded with fibers and/or particulates may also be microapertured so that it defines at least about 160,000 microapertures per square inch.

In accordance with the definition of "thin" soft film material, the average thickness of the thin soft film material is less than about ten mils. Additionally, the average thickness of the thin soft film material is at least about 0.25 mil. For example, the average thickness of the thin soft film material may range from at least about 0.25 mil to about 5 mils. More particularly, the average thickness of the film material may range from at least about 0.25 mil to about 2 mils. Even more particularly, the average thickness of the film material may range from at least about 0.5 mil to about 1 mil.

The invention also is directed to a method for embedding fibers and/or particulates, or both, in a thin soft film material. The process includes the steps of (a) placing the thin soft film material on an anvil means; (b) conveying the thin soft film material, while placed on the anvil means, through an area where a mixture of a fluid and fibers and/or particulates, or both, is applied to the thin soft film material; and (c) subjecting the thin soft film material to a sufficient amount of ultrasonic vibrations in the area where the fluid and fibers and/or particulates, or both, are applied to the thin soft film material to embed the fibers, particulates or both into the thin soft film material.

The fluid may be selected from the group including one or more of water, mineral oil, a chlorinated hydrocarbon, ethylene glycol or a solution of 50 volume percent water and 50 volume percent 2 propanol. For example, the chlorinated hydrocarbon may be selected form the group including 1,1,1 trichloroethane or carbon tetrachloride.

In some embodiments it may be desirable for the embedding to be confined to a predesignated area or areas of the soft thin film. This result may be obtained where only a portion of the soft thin film is subjected to ultrasonic vibrations.

Where it is desired only to embed the fibers, particulates or both into the thin soft film material, the anvil means may be selected from the group including a smooth, nonpatterned, stainless steel shim material or a smooth, non-patterned roller coated with a resilient material.

Where it is desired to both embed fibers, particulates, or both, into the thin soft film material and to microaperture the thin soft film material, the anvil means should be a pattern anvil mechanism having a pattern of raised areas.

THE FIGURES

DETAILED DESCRIPTION OF THE INVENTION

Figure 1:
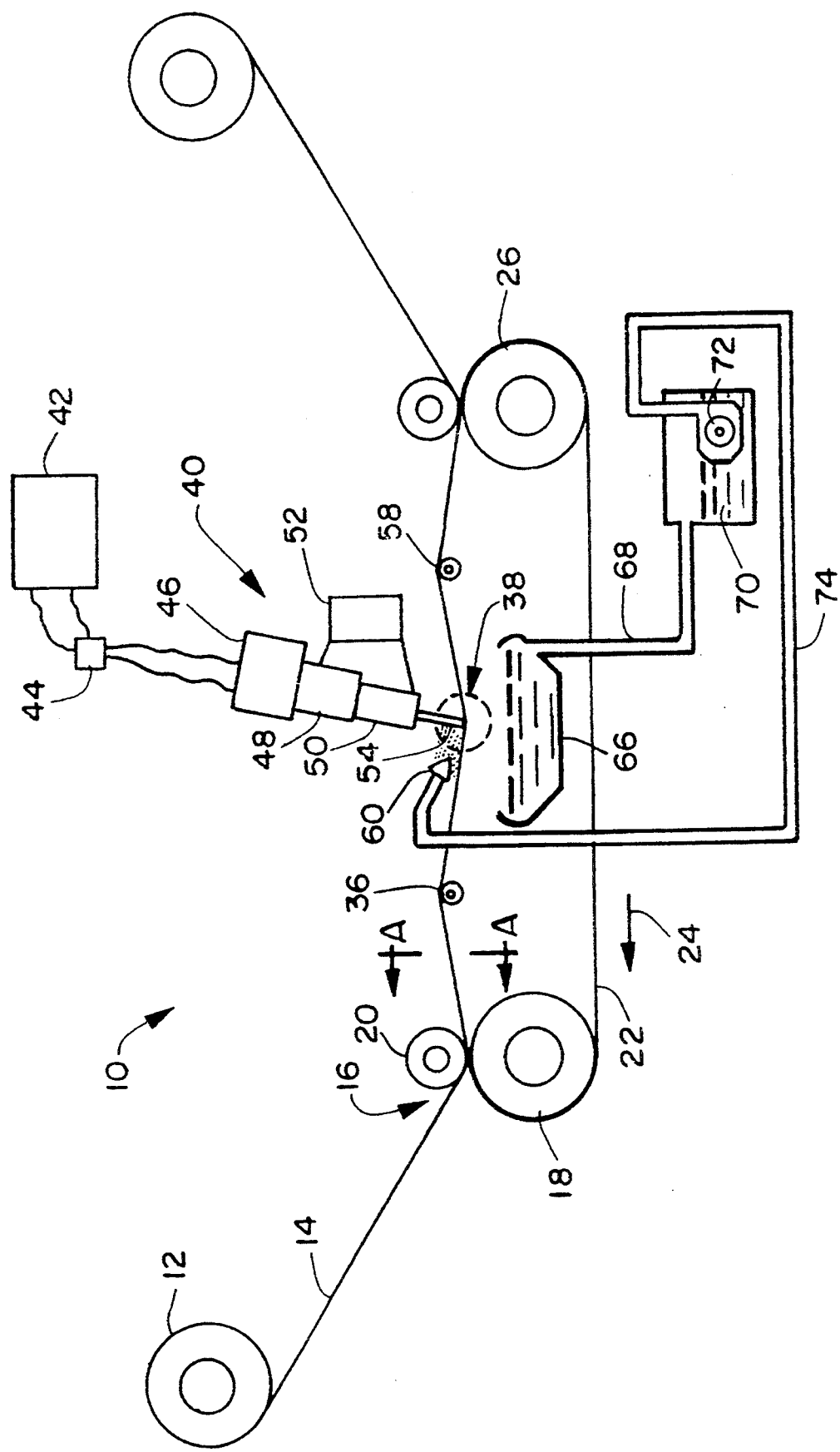
FIG. 1 is a schematic representation of apparatus which utilizes ultrasonic vibrations to embed fibers and/or particulates in thin soft film materials.

Turning now to the Figures where like reference numerals represent like structure and, in particular to FIG. 1 which is a schematic representation of an apparatus which can carry out the method of the present invention, it can be seen that the apparatus is generally represented by the reference numeral 10. In operation, a supply roll 12 of a thin soft film material 14 into which fibers, particulates, or both are to be embedded is supplied. As has been previously stated, the term thin soft film material refers to film materials which have an average thickness of about ten (10) mils or less. Additionally, generally speaking the average thickness of the thin soft film material 14 will be at least about 0.25 mil. For example, the average thickness of the thin soft film 14 material may range from about 0.25 mil to about 5 mils. More particularly, the average thickness of the thin soft film material 14 may range from about 0.25 mil to about 2 mils. Even more specifically, the average thickness of the thin soft film material 14 may range from about 0.5 mil to about 1 mil.

The thin soft film material 14 may be formed from any suitable material meeting the definition of soft contained herein. For example, the thin soft film material may be formed from soft materials such as soft polyolefins such as, for example, soft polypropylenes or soft polyethylenes; soft urethanes or soft elginlates such as carrageenan.

The thin soft film material 14 is transported to a first nip 16 formed by a first transport roll 18 and a first nip roller 20 by the action of an endless transport mechanism 22 which moves in the direction indicated by the arrow 24. The transport mechanism 22 is driven by the rotation of the first transport roller 18 in conjunction with a second transport roller 26 which, in turn, are driven by a conventional power source, not shown.

Figure 2:
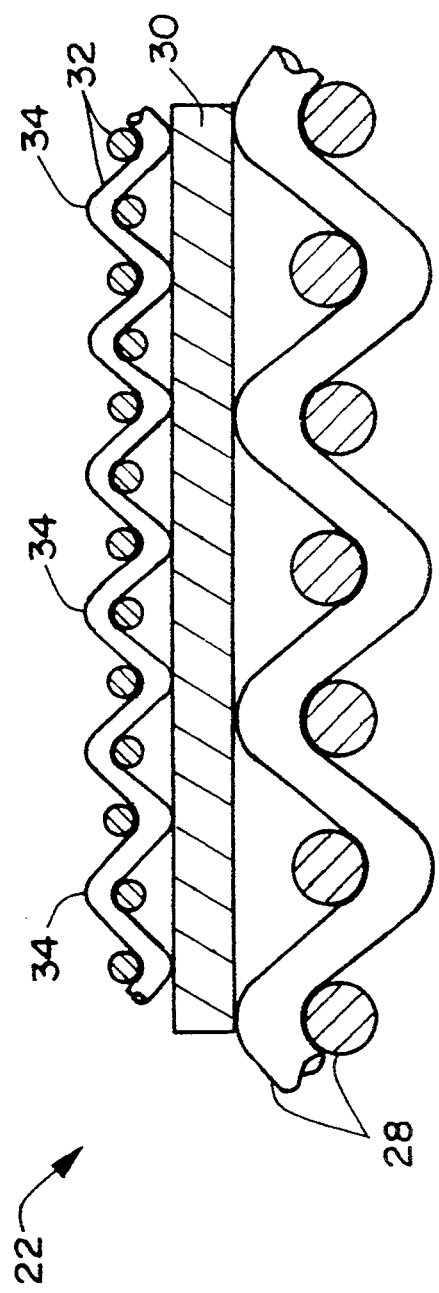
FIG. 2 is a cross sectional view of the transport mechanism for transporting the thin soft film material to the area where it is subjected to ultrasonic vibrations.

FIG. 2 is a cross sectional view of the transport mechanism 22 taken along lines A—A in FIG. 1. FIG. 2 discloses that the transport mechanism 22 includes a heavy duty transport wire mesh screen 28 usually having a mesh count of less than about 400 (i.e. less than a 20 wires per inch MD by 20 wires per inch CD mesh screen if machine direction (MD) and cross machine direction (CD) wire count is the same). Heavy duty mesh wire screens of this type may be made from a variety of materials such as, for example, plastics, nylons or polyesters, and are readily available to those in the art. Located above and attached to the transport screen 28 is an endless flat shim plate 30. The shim plate 30 desirably is formed from stainless steel. However, those of skill in the art will readily recognize that other materials may be utilized.

From the first nip 16 the thin soft film material 14 is transported by the transport mechanism 22 over a tension roll 36 to an area 38 (defined in FIG. 1 by the dotted lined circle) where the thin soft film material 14 is subjected to ultrasonic vibrations.

The assembly for subjecting the thin soft film material 14 to the ultrasonic vibrations is conventional and is generally designated at 40. The assembly 40 includes a power supply 42 which, through a power control 44, supplies power to a piezoelectric transducer 46. As is well known in the art, the piezoelectric transducer 46 transforms electrical energy into mechanical movement as a result of the transducer's vibrating in response to an input of electrical energy. The vibrations created by the piezoelectric transducer 46 are transferred, in conventional manner, to a mechanical movement booster or amplifier 48. As is well known in the art, the mechanical movement booster 48 may be designed to increase the amplitude of the vibrations (mechanical movement) by a known factor depending upon the configuration of the booster 48. In further conventional manner, the mechanical movement (vibrational energy) is transferred from the mechanical movement booster 48 to a conventional knife edge ultrasonic horn 50. It should be realized that other types of ultrasonic horns 50 could be utilized. For example, a rotary type ultrasonic horn could be used. The ultrasonic horn 50 may be designed to effect yet another boost or increase in the amplitude of the mechanical movement (vibrations) which is to be applied to the thin soft film material 14. Lastly, the assembly includes an actuator 52 which includes a pneumatic cylinder, not shown. The actuator 52 provides a mechanism for raising and lowering the assembly 40 so that the tip 54 of the ultrasonic horn 50 can apply tension to the transport mechanism 22 upon the assembly 40 being lowered. It has been found that it is necessary to have some degree of tension applied to the transport mechanism 22 upon the lowering of the assembly for proper application of vibrational energy to the thin soft film material 14 to embed solid materials such as fibers, particulates, or both into the thin soft film material 14.

One desirable aspect of this tensioned arrangement is that the need to design a finely toleranced gap between the tip 54 of the horn 50 and the shim plate 30.

Figure 3:
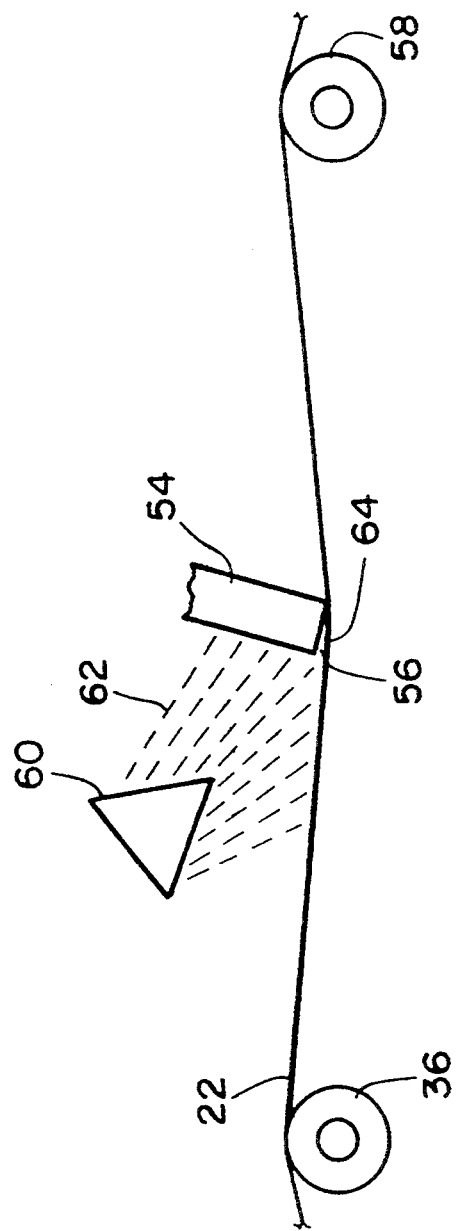
FIG. 3 is a detailed view of the area where the thin soft film material is subjected to ultrasonic vibrations. The area is designated by the dotted circle in FIG. 1.

FIG. 3 is a schematic representation of the area 38 where the ultrasonic vibrations are applied to the thin soft film material 14. As can be seen in FIG. 3, the transport mechanism 22 forms an angle 56 with the tip 54 of the ultrasonic horn 50. While some embedding will occur if the angle 56 is as great as 45 degrees, it has been found that it is desirable for the angle 56 to range from about 5 degrees to about 15 degrees. For example, the angle 56 may range from about 7 to about 13 degrees. More particularly, the angle 56 may range from about 9 to about 11 degrees.

FIG. 3 also illustrates that the transport mechanism 22 is supported from below by the first tension roll 36 and a second tension roll 58. Positioned somewhat prior to the tip 54 of the ultrasonic horn 50 is a spray nozzle 60 which is configured to apply a mixture of a fluid and the fibers, particulates, etc. 62 which are to be embedded into the surface of the thin soft film material 14 just prior to the sheet material 14 being subjected to ultrasonic vibrations by the tip 54 of the ultrasonic horn 50. The fluid portion of the mixture 62 desirably may be selected from the group including one or more of water, mineral oil, a chlorinated hydrocarbon, ethylene glycol or a solution of 50 volume percent water and 50 volume percent 2 propanol. For example, in some embodiments the chlorinated hydrocarbon may be selected from the group including 1,1,1 trichloroethane or carbon tetrachloride. The fibers and/or particulates or both which may be utilized in the mixture 62 may be any type of fibers having sufficient rigidity to allow there being embedded into the thin soft film material 14. For example, the fibers may be selected from the group including metallic fibers such as are found in steel wool; naturally occurring fibers such as, for example, wood pulp fibers, cotton fibers and wool fibers; and synthetic fibers such as polyolefin fibers, rayon fibers and nylon fibers. The particulates to be embedded may be of any type which is able to withstand hydrosonic treatment. For example, the particulates may be selected from the group including calcium carbonate, silicon carbide, diamond or activated charcoal.

It should be noted that the wedge-shaped area 64 formed by the tip 54 of the ultrasonic horn 50 and the transport mechanism 22 should be subjected to a sufficient amount of the mixture 62 for the fluid to act as both a heat sink and a coupling agent for the most desirable results.

Positioned below the transport mechanism 22 in the area where the tip 54 of the ultrasonic horn 50 is located is a mixture collection tank 66. (See FIG. 1.) The mixture collection tank 66 serves to collect mixture 62 which has been applied to the surface of the thin soft film material 14 and which has been driven through the transport mechanism 22 or over the edges of the transport mechanism 22 by the action of the vibrations of the tip 54 of the ultrasonic horn 50. Mixture 62 which is collected in the collection tank 66 is transported by tubing 68 to a mixture holding tank 70.

FIG. 1 illustrates that the mixture holding tank 70 contains a pump 72 which, by way of additional tubing 74, supplies the mixture 62 to the mixture spray nozzle 60. Accordingly, the mixture 62 may be re-cycled for a considerable period of time.

While the mechanism of action may not be fully understood and the present application should not be bound to any particular theory or mechanism of action, it is believed that the presence of the fluid portion of the mixture 62 in the wedge-shaped area 64 during operation of the ultrasonic horn 50 accomplishes two separate and distinct functions. First, the presence of the fluid portion allows the fluid to act as a heat sink which allows the ultrasonic vibrations to be applied to the thin soft film material 14 without the thin soft film material 14 being altered or destroyed as by melting. Secondly, the presence of the fluid portion of the mixture 62 in the wedge-shaped area 64 allows the fluid to act as a coupling agent in the application of the vibrations from the ultrasonic horn 50 to the thin soft film material 14.

It has been discovered that the action of the ultrasonic horn 50 on the fibers, particulates, or both, in the mixture 62 embeds them in the soft film material 14.

If it is desired to provide a soft thin film material 14 which is both embedded with fibers, particulates, both, etc., this may be accomplished in accordance with the teachings of our other above-referenced applications. To accomplish this, it is necessary to locate above and attach to the shim plate 30 a fine mesh wire pattern screen 32 usually having a mesh count of at least about 2,000 (i.e. at least about 45 wires per inch MD by 45 wires per inch CD mesh screen if MD and CD wire count is the same). Fine mesh wire screens of this type are readily available to those in the art. The fine mesh wire screen 32 has raised areas or knuckles 34 which preform the function of a pattern anvil as ,will be discussed later.

As the thin soft film material 14 is subjected to the hydrosonic forces, the microapertures are punched through the thin soft film material 14 in the pattern of the raised areas or knuckles 34 of the fine mesh wire pattern screen 32. Generally, the number of microapertures produced will be equal to the number of raised areas or knuckles 34 on the upper surface of the fine mesh wire screen 32. That is, the number of microapertures will generally be one-half the mesh count of a given area of pattern screen 32. For example, if the pattern screen 32 is 100 wires per inch MD by 100 wires per inch CD, the total number of knuckles or raised areas 34 on one side of the pattern wire, per square inch, 32 will be 100 times 100 divided by 2. This equals 5,000 microapertures per square inch. For a 200 wires pear inch by 200 wires per inch mesh pattern screen 32 the calculation yields 20,000 microapertures per square inch. Depending somewhat on the thickness of the thin soft film material 14, at a mesh count of about 90,000 (300 wires per inch MD by 300 wires per inch CD) the wires are so thin as to allow the knuckles 34 on both sides to microaperture the thin soft film material 14 if sufficient force is applied. Thus, a 300 wires per inch MD by 300 wires per inch CD mesh screen yields 90,000 microapertures per square inch; for a 400 wires per inch MD by 400 wires per inch CD mesh—160,000 microapertures per square inch. Of course the MD and CD wire count of the wire mesh screen does not have to be the same.

It should also be noted that the number of microapertures formed may also vary with the number of ultrasonic vibrations to which the thin soft film material 14 is subjected per unit area for a given period of time. This factor may be varied in a number of ways. For example, the number and size of the microapertures will vary somewhat with the line speed of the thin soft film material 14 as it passes underneath the tip 54 of the ultrasonic horn 50. Generally speaking, as line speed increases, first the size of the microapertures decreases and then the number of microapertures decreases. As the number of microapertures decreases the less the pattern of microapertures resembles the pattern of raised areas 34 on the pattern screen 32. The range of line speeds that usually yields microapertures varies with the soft material utilized to form the thin soft film material 14 and the material used as the fluid in the mixture 62. For polyethylene having a thickness of about 0.5 mil, typical line speeds which usually yield microapertures for a variety of fluids range from about 7 to about 25 feet per minute. For example, if water is the fluid in the mixture and the film material is a polyethylene, typical line speeds which usually yield microapertures range from about 7 to about 23 feet per minute. It is believed that, to some extent, the variations in the number of microapertures formed and the size of the microapertures occurs due to the minute variations in the height of the raised areas or knuckles 34 of the fine mesh pattern screen 32. It should be noted that the fine mesh pattern screens used to date have been obtained from conventional everyday sources such as a hardware store. It is also believed that if a pattern screen 32 could be created where all of the raised areas 34 of the screen 32 were of exactly the same height these variations would only occur in uniform fashion with variations of line speed.

As was stated above, the area or size of each of the microapertures formed will also vary with the parameters discussed above. The area of the microapertures will also vary with the area of the raised areas of the pattern anvil such as the knuckles 34 on the fine mesh wire screen 32. It is believed that the type of soft material used in forming the thin soft film material 14 will also vary the area of the microapertures formed if all other parameters are maintained the same. For example, the softer the thin soft film material 14, the easier it is to push the thin soft film material 14 through the raised areas of the fine mesh pattern screen 32. Because the raised areas (knuckles) on the fine mesh screen are generally pyramidal in shape, the deeper the raised area penetrates the thin soft film material 14, the larger the microaperture. Of course, the height of the raised areas must be greater than the thickness of the thin sheet material 14 for microapertures to be formed and the degree of excess necessary may vary with the type of soft film material 14 to be microapertured. Generally speaking, the more stretchable the material, the greater the height of the raised areas 34 must exceed the thickness of the thin soft film material 14.

In some embodiments it may be necessary to subject the thin soft film material 14 to multiple passes through the apparatus 10 in order to microaperture the thin sheet material 14. In such situations the thin sheet material 14 will initially only be thinned in the pattern of the pattern anvil's raised areas. However, two or more passes through the apparatus 10, with the thin soft film material 14 being aligned in the same configuration with respect to the pattern anvil, yields microapertures. Essentially what is happening in these situations is that the thin soft film material 14 is repeatedly thinned by repeated application of ultrasonic vibrational force until such time as microapertures are formed. Alternatively, the fine mesh wire diameter size may be increased with the consequent decrease in mesh count. Increasing the wire diameter size of the fine mesh screen 32 increases the likelihood that microapertures will be formed.

Of course, if it is desired. to provide a thin soft film material 14 which has fibers, particulates, or both embedded therein and also having thinned areas or microareas, the amount of ultrasonic energy may need to be adjusted downwardly so that thinning and not microaperturing occurs. For more details on the details of the thinned area process, reference should be made to our referenced U.S. patent application Ser. No. 07/767,727, entitled "Process For Hydrosonically Area Thinning Thin Sheet Materials" which has been incorporated herein by reference in its entirety.

Another feature of the present invention is the fact that the microapertures or thinned areas or microareas can be formed in a predesignated area or areas of the thin soft film material 14. This can be accomplished in a number of ways. For example, the thin soft film material 14 may be subjected to ultrasonic vibrations only at certain areas of the thin soft film material 14. Alternatively, the entire thin soft film material 14 could be subjected to ultrasonic vibrations with the pattern anvil having raised areas 34 only at certain locations and otherwise being flat. Accordingly, the thin soft film material 14 would be microapertured only in those areas which corresponded to areas on the pattern anvil having raised areas.

It should also be noted that some limitation exists in the number of microapertures which can be formed in a given thin soft film material 14 on a singe application of vibrational energy, i.e. a single pass through the apparatus 10 if a wire mesh screen is used as the pattern anvil. This follows from the fact that, as was stated above, the height of the raised areas 34 must exceed the thickness of the thin soft film material 14 in conjunction with the fact that, generally as the mesh count increases the height of the raised areas or knuckles decreases. In such situations, if the number of microapertures desired per unit area is greater than the number which can be formed in one pass through the apparatus, multiple passes are necessary with the alignment of the thin soft film material 14 with respect to the raised ares being altered or shifted slightly on each pass.

Generally speaking the area of each of the microapertures is greater than about ten square micrometers. That is the area of each of the microapertures of each of the may range from at least about 10 square micrometers to about 100,000 square micrometers. For example, the area of each of the microapertures may generally range from at least about 10 square micrometers to about 10,000 square micrometers. More particularly, the area of each of the microapertures may generally range from at least about 10 square micrometers to about 1,000 square micrometers. Even more particularly, the area of each of the microapertures may generally range from at least about 10 square micrometers to about 100 square micrometers.

A number of important observations about the process may now be made. For example, it should be understood that the presence of the fluid portion of the mixture 62 is highly important to the present inventive process which uses the fluid as a coupling agent. Because a coupling agent is present, the fibers, particulates or both are embedded into the thin soft film material 14. Additionally, the presence of the shim plate 30 or its equivalent is necessary in order to provide an anvil mechanism against which the thin soft film material 14 may be worked, that is apertured, by the action of the tip 54 of the ultrasonic horn 50. Because the vibrating tip 54 of the ultrasonic horn 50 is acting in a hammer and anvil manner when operated in conjunction with the heavy duty wire mesh screen 28/shim plate 30/fine wire mesh 32 combination, it should be readily recognized that a certain degree of tension must be placed upon the transport mechanism 22 by the downward displacement of the ultrasonic horn 50. If there is little or no tension placed upon the transport mechanism 22, the shim plate 30 cannot preform its function as an anvil and microaperturing generally does not occur. Because both the shim plate 30 and the fine mesh pattern wire 32 form the resistance that the ultrasonic horn 50 works against, they are collectively referred herein as a pattern anvil combination. It should be easily recognized by those in the art that the function of the pattern anvil can be accomplished by other arrangements than the heavy duty wire mesh screen 28/shim plate 30/fine mesh screen 32 combination. For example, the pattern anvil could be a flat plate with raised portions acting to direct the microaperturing force of the ultrasonic horn 50. Alternatively, the pattern anvil could be a cylindrical roller having raised areas. If the pattern anvil is a cylindrical roller, it is desirable for the pattern anvil to be wrapped or coated with or made from a resilient material. Where the pattern anvil is a mesh screen the resiliency is provided by the fact that the screen is unsupported directly below the point of application of ultrasonic vibrations to the mesh screen.

The invention will now be discussed with regard to specific examples which will aid those of skill in the art in a full and complete understanding thereof.

EXAMPLE I

A sheet of 0.5 mil thick polyethylene film having the trade designation S/E 702 obtained from the Edison Company of Plainfield, N.J., and was cut into a length of about 11 inches and a width of about 8.5 inches. The sample was subjected to hydrosonic treatment in accordance with the present invention.

A model 1120 power supply obtained from the Branson Company of Danbury, Conn., was utilized. This power supply, which has the capacity to deliver 1,300 watts of electrical energy, was used to convert 115 volt, 60 cycle electrical energy to 20 kilohertz alternating current. A Branson type J4 power level control, which has the ability to regulate the ultimate output of the model 1120 power supply from 0 to 100%, was connected to the model 1120 power supply. In this example, the power level control was set at 100%. The actual amount of power consumed was indicated by a Branson model A410A wattmeter. This amount was about 1,100 watts.

The output of the power supply was fed to a model 402 piezoelectric ultrasonic transducer obtained from the Branson Company. The transducer converts the electrical energy to mechanical movement. At 100% power the amount of mechanical movement of the transducer is about 0.8 micrometers.

The piezoelectric transducer was connected to a mechanical movement booster section obtained from the Branson Company. The booster is a solid titanium metal shaft with a length equal to one-half wave length of the 20 kilohertz resonant frequency. Boosters can be machined so that the amount of mechanical movement at their output end is increased or decreased as compared to the amount of movement of the transducer. In this example the booster increased the amount of movement and has a gain ratio of about 1:2.5. That is, the amount of mechanical movement at the output end of the booster is about 2.5 times the amount ore movement of the transducer.

The output end of the booster was connected to an ultrasonic horn obtained from the Branson Company. The horn in this example is made of titanium with a working face of about 9 inches by about ½ inch. The leading and trailing edges of the working face of tire horn are each curved on a radius of about ⅛ inch. The horn step area is exponential in shape and yields about a two-fold increase in the mechanical movement of the booster. That is, the horn step area has about a 1:2 gain ratio. The combined increase, by the booster and the horn step area, in the original mechanical movement created by the transducer yields a mechanical movement of about 4.0 micrometers.

The forming table arrangement included a small forming table which was utilized to transport and support the polyethylene film which is to have fiber embedded in it. The forming table included two 2-inch diameter idler rollers which were spaced about 12 inches apart on the surface of the forming table. A transport mesh belt encircles the two idler rollers so that a continuous conveying or transport surface is created. The transport mesh belt is a square weave 20×20 mesh web of 0.020 inch diameter plastic filaments. The belt is about 10 inches wide and is raised above the surface of the forming table.

The transducer/booster/horn assembly, hereinafter the assembly, is secured in a Branson series 400 actuator. When power is switched on to the transducer, the actuator, by means of a pneumatic cylinder with a piston area of about 4.4 square inches, lowers the assembly so that the output end of the horn contacts the sheet of polyethylene film which is to have fibers embedded therein. The actuator also raises the assembly so that the output end of the horn is removed from contact with the sheet of polyethylene film when power is switched off.

The assembly is positioned so that the output end of the horn is adapted so that it may be lowered to contact the transport mesh belt between the two idler rollers. An 8-inch wide 0.005-inch thick stainless steel shim stock having a length of about 60 inches was placed on the plastic mesh transport belt to provide an anvil mechanism. The sheet of polyethylene film which was to have fibers embedded therein was then fastened onto the metal shim using masking tape.

The forming table arrangement also included a mixture circulating system. The circulating system includes a mixture reservoir tank, a mixture circulating pump which may conveniently be located within the tank, associated tubing for transporting the mixture from the tank to a slotted boom which is designed to direct a curtain of mixture into the juncture of the output end of the horn and sheet of polyethylene film which is to have fibers embedded therein. In operation, the assembly was positioned so that the output end of the horn was at an angle of from about 10 to 15 degrees to the sheet of polyethylene film. Accordingly, a wedge shaped chamber was formed between the output end of the horn and the sheet of polyethylene film. It is into this wedge shaped chamber that the mixture, in this example a slurry of water and southern softwood obtained from the Kimberly-Clark Corporation Company under the trade designation CR54 was directed by the slotted boom. The slurry was prepared by placing the pulp into a British Disintegrator for about 3,000 revolutions. The slurry was maintained at room temperature.

It should be noted that the actuator was positioned at a height to insure that, when the assembly is lowered, the downward movement of the output end of the horn is stopped by the tension of the transport mesh before the actuator reaches the limit of its stroke. In this example, actuating pressure was adjusted to 12 pounds per square inch as read on a pressure gauge which is attached to the pneumatic cylinder of the actuator. This adjustment results in a total downward force of 52.8 pounds. (12 psi times 4.4 square inches of piston area equals 52.8 pounds of force.)

The sequence of operation was (1) the mixture pump was switched on and the area where the output end of the horn was to contact the polyethylene film was flooded with the mixture; (2) the transport mesh conveyor system was switched on and the polyethylene film started moving at 5 feet per minute; and (3) power to the assembly was supplied and the assembly was lowered so that the output end of the horn contacted the polyethylene film while the film continued to pass under the output end of the horn until the end of the sample was reached. The reading on the A410A wattmeter during the process is an indication of the energy required to maintain maximum mechanical movement at the output end of the horn while working against the combined mass of the mixture, the polyethylene film, the shim stock, and the transport wire.

This example yielded a polyethylene film having fibers embedded therein.

Figure 4B:
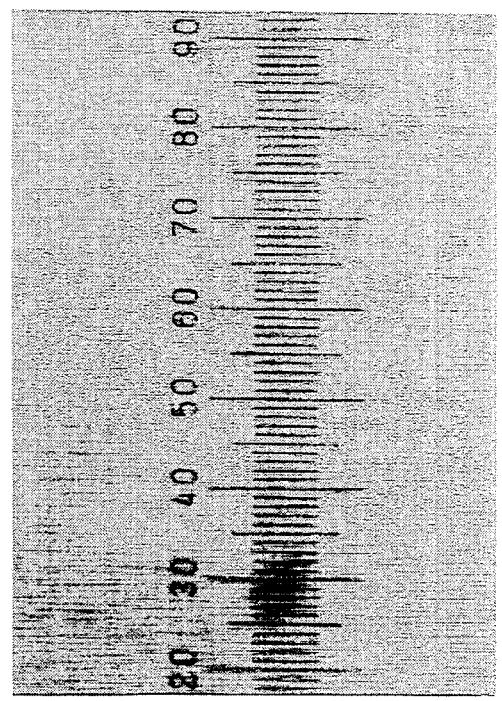
FIG. 4B is the scale for FIG. 4A where each unit represents ten microns (micrometers).
Figure 4A:
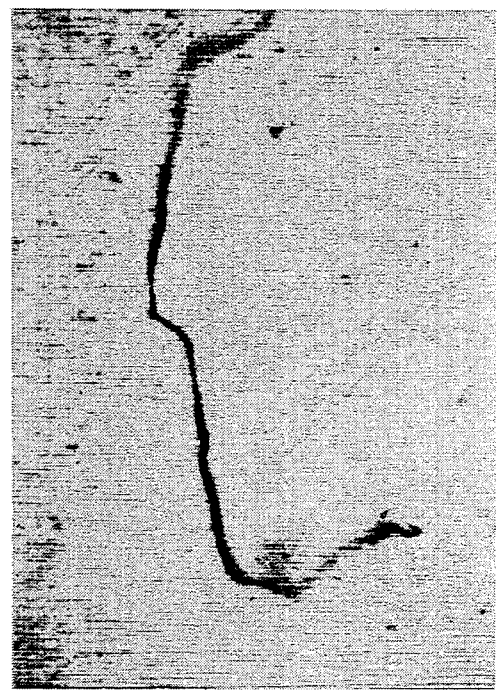
FIG. 4A is a photomicrograph of a 0.5 mil thick thin soft film of polyethylene which has had southern softwood fibers embedded therein in accordance with the present invention.

FIG. 4A is a photomicrograph of the polyethylene film processed by Example I having fibers embedded therein.

EXAMPLE II

The process of Example I was repeated with the exception that a 250 mesh wire was placed on top of the shim. The power utilized was about 1,200 watts. The results of this experiment were generally the same as those of Example I with the exception that the polyethylene film was both embedded with fibers and microapertured.

Figure 5B:
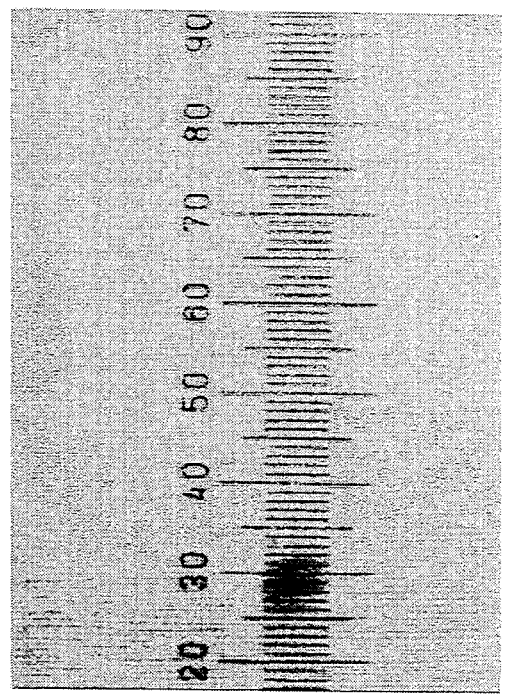
FIG. 5B is the scale for FIG. 5A where each unit represents ten microns (micrometers).
Figure 5A:
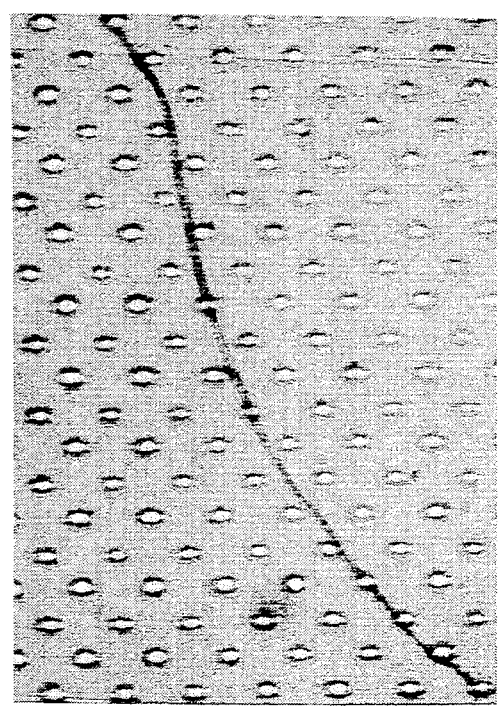
FIG. 5A is a photomicrograph of a 0.5 mil thick thin soft film of polyethylene which has been microapertured and has had southern softwood fibers embedded therein in accordance with the present invention.

FIG. 5A is a photomicrograph of the polyethylene film of Example II having fibers embedded therein.

EXAMPLE III

The process of Example II was repeated with the exception that the mixture was a mixture of water and calcium carbonate. About 127.6 rams of calcium carbonate was mixed with about 23 kilograms of water. The calcium carbonate was obtained from the Aldrich Chemical Company of Milwaukee, Wis. and was a crystalline material of cubic shape and approximately 8 microns in size. The watts utilized was read as about 800. The line speed of the polyethylene film was 7 feet per minute and the actuating pressure was about 8 pounds per square inch. The results of this experiment were generally the same as those of Example II. The size of the microapertures was about 5 micrometers by 10 micrometers.

Figure 6B:
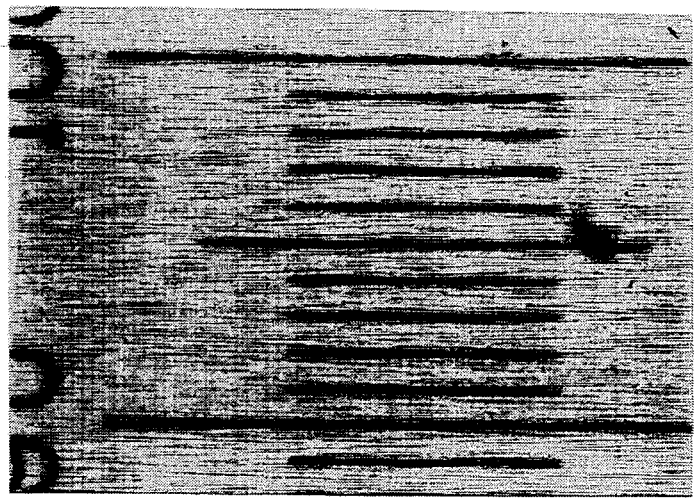
FIG. 6B is the scale for FIG. 6A where each unit represents ten microns (micrometers).
Figure 6A:
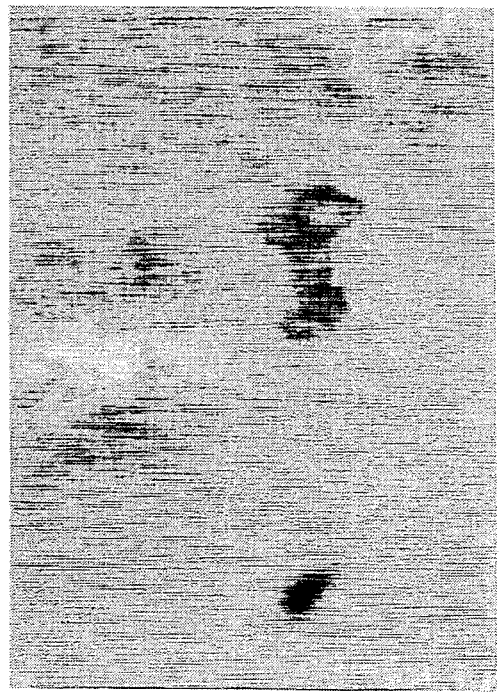
FIG. 6A is a photomicrograph of a 0.5 mil thick thin soft film of polyethylene which has been microapertured and has had calcium carbonate particulates embedded therein in accordance with the present invention.

FIG. 6A is a photomicrograph of the polyethylene film of Example III having particulates embedded therein.

EXAMPLE IV

The process of Example III was repeated except that about 262.1 grams of calcium carbonate was used.

The results of this experiment were generally the same as those of Example III.

EXAMPLE V

The process of Example III was repeated except that about 125.5 grams of 280 mesh, irregular shape silicon carbide obtained from the Supreme Felt & Abrasive Co. of Melrose, Ill. was substituted for the calcium carbonate. The silicon carbide had an approximate size of eight microns.

The results of this experiment were generally the same as those of Example III.

Figure 7B:
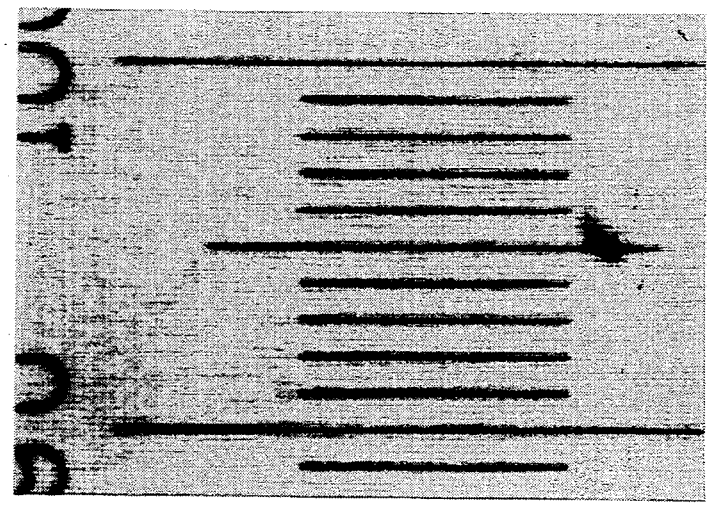
FIG. 7B is the scale for FIG. 7A where each unit represents ten microns (micrometers).
Figure 7A:
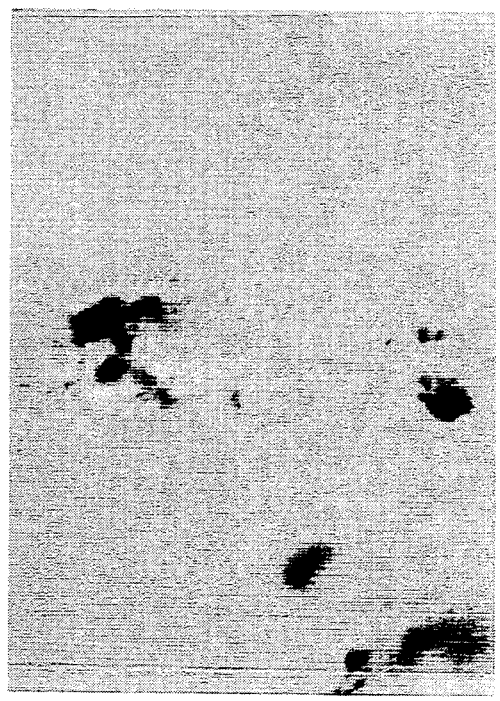
FIG. 7A is a photomicrograph of a 0.5 mil thick thin soft film of polyethylene which has been microapertured and has had silicon carbide particulates embedded therein in accordance with the present invention.

FIG. 7A is a photomicrograph of the polyethylene film of Example VII having silicon carbide embedded therein.

EXAMPLE VI

The process of Example V was repeated with the exception that about 151.1 grams of silicon carbide was used. The results of this experiment were generally the same as those of Example V.

FIG. 7A is a photomicrograph of polyethylene film of having silicon carbide particulates embedded therein in accordance with Example V.

The uses to which the thin soft film material having fibers, particulates or other solids embedded may be put are numerous. For example, the material may be utilized as abrasive cloths such as sandpaper. Alternatively, the material could provide a cotton-like film sheet for use as an outer cover for a diaper. The process of manufacturing many plastic materials could be modified by the teachings of the present invention so that their coefficient of friction was increased and they are less slippery.

It is to be understood that variations and modifications of the present invention may be made without departing from the scope of the invention. For example, in some embodiments the use of multiple ultrasonic horns aligned abreast or sequentially may be desirable. It is also to be understood that the scope of the present invention is not to be interpreted as limited to the specific embodiments disclosed herein, but only in accordance with the appended claims when read in light of the foregoing disclosure.

What is claimed is:

1. A thin soft film having a material embedded therein and wherein the embedded material consists of individual fibers.

2. The thin soft film material of claim 1, wherein the fibers are selected from the group consisting of metallic fibers, wood pulp fibers, cotton fibers, wool fibers, polyolefin fibers, rayon fibers and nylon fibers.

3. A microapertured thin soft film formed from a material selected from the group consisting of soft polyolefins, soft urethanes and soft alginates, said film:

defining at least about 1,000 microapertures per square inch; and having at least one fiber selected from the group consisting of metallic fibers, wood pulp fibers, cotton fibers, wool fibers, polyolefin fibers, rayon fibers and nylon fibers individually embedded therein; and wherein the area of each of the microapertures ranges from at least about 10 square micrometers to about 100 square micrometers.

4. The thin soft film material of claim 1, wherein the soft film material is selected from the group consisting of soft polyolefins, soft urethanes and soft alginates.

5. The thin soft film material of claim 4, wherein the polyolefin is selected from the group consisting of soft polyethylenes and soft polypropylenes.

6. The thin soft film material of claim 1, wherein the soft film material also defines at least about 1,000 microapertures per square inch.

7. The thin soft film material of claim 1, wherein the soft film material also defines at least about 5,000 microapertures per square inch.

8. The thin soft film material of claim 1, wherein the soft film material also defines at least about 20,000 microapertures per square inch.

9. The thin soft film material of claim 1, wherein the soft film material also defines at least about 90,000 microapertures per square inch.

10. The thin soft film material of claim 1, wherein the soft film material also defines at least about 160,000 microapertures per square inch.

11. The thin soft film material of claim 1, wherein the average thickness of the film material is at least about 0.25 mil.

12. The thin soft film material of claim 1, wherein the average thickness of the film material is from at least about 0.25 mil to about 5 mils.

13. The thin soft film material of claim 1, wherein the average thickness of the film material is from at least about 0.25 mil to about 2 mils.

14. The thin soft film material of claim 1, wherein the average thickness of the film material is from at least about 0.5 mil to about 1 mil.

15. The thin soft film material of claim 1, wherein the embedded material is embedded only in predesignated areas of the thin soft film material.

16. A thin soft film formed from a material selected from the group consisting of soft polyolefins, soft urethanes and soft alginates, said film:

having at least one fiber individually embedded therein; and wherein the fiber is selected from the group consisting of metallic fibers, wood pulp fibers, cotton fibers, wool fibers, polyolefin fibers, rayon fibers and nylon fibers.

17. The thin soft film material of claim 4, wherein the soft alginate is carrageenan.

18. The thin soft film material of claim 16, wherein the soft alginate is carrageenan.

* * * * *